US012636899B2

(12) United States Patent
Wakabayashi

(10) Patent No.: US 12,636,899 B2
(45) Date of Patent: May 26, 2026

(54) IMAGE FORMING APPARATUS, DISPLAY CONTROL METHOD, AND COMPUTER READABLE STORAGE MEDIUM

(71) Applicant: CANON KABUSHIKI KAISHA, Tokyo (JP)

(72) Inventor: Tetsu Wakabayashi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 158 days.

(21) Appl. No.: 18/587,400

(22) Filed: Feb. 26, 2024

(65) Prior Publication Data

US 2024/0286855 A1 Aug. 29, 2024

(30) Foreign Application Priority Data

Feb. 27, 2023 (JP) ................................ 2023-028500

(51) Int. Cl.

*B41J 11/48* (2006.01)
*B65H 7/04* (2006.01)
*G03G 15/00* (2006.01)

(52) U.S. Cl.

CPC .............. *B41J 11/485* (2013.01); *B65H 7/04* (2013.01); *G03G 15/502* (2013.01); *B65H 2301/122* (2013.01); *B65H 2551/14* (2013.01); *B65H 2551/21* (2013.01); *B65H 2701/1862* (2013.01); *G03G 2215/00725* (2013.01)

(58) Field of Classification Search

CPC ............... B41J 11/485; B65H 2301/12; B65H 2701/1862; G03G 2215/00725; G03G 15/6508; G03G 15/502; G03G 15/5016

See application file for complete search history.

(56) References Cited

U.S. PATENT DOCUMENTS 8,714,541 B2 * 5/2014 Kato ...................... B41J 11/006 226/10
9,280,112 B2 * 3/2016 Akimoto .............. G03G 15/502
11,650,775 B2 5/2023 Kanamori

FOREIGN PATENT DOCUMENTS

JP 2021-135897 A 9/2021

OTHER PUBLICATIONS

"SureColor", retrieved from Internet on Jan. 30, 2023 from <URL: https://www.epson.jp/products/largeprinter/sct3150/feature_1.htm>, 5 pages.

* cited by examiner

*Primary Examiner* — Jeremy R Severson
(74) *Attorney, Agent, or Firm* — Venable LLP

(57) ABSTRACT

An image forming apparatus includes a plurality of feeding units configured to correspond to respective types of sheets; a detecting unit configured to detect whether or not a sheet is mounted in each of the feeding units; and a display control unit configured to display on a display part a preparation screen for printing on a type of sheet corresponding to one of the feeding units in a case where the type of sheet is mounted in the one of the feeding units whereas no sheet is mounted in any of other feeding units at the time a function including a printing function is selected.

13 Claims, 12 Drawing Sheets

IMAGE FORMING APPARATUS, DISPLAY CONTROL METHOD, AND COMPUTER READABLE STORAGE MEDIUM

BACKGROUND OF THE DISCLOSURE

Field of the Disclosure

The present disclosure relates to an image forming apparatus, a display control method, and a computer readable storage medium.

Description of the Related Art

Image forming apparatuses such as printers used in business have multiple feeding ports where two or more types of sheets can be mounted. For example, in order to meet the needs of users who want to print A4-sized documents, CAD drawings, and the like while working from home, image forming apparatuses that can feed both roll paper and cut paper have been developed in recent years (for example, "SureColor", <URL: https://www.epson.jp/products/largeprinter/sct3150/feature_1.htm>, hereinafter referred to as Document 1). The user is required to perform an operation to select a feeding port in order to execute printing on a desired sheet from multiple types of sheets mounted in such an image forming apparatus.

Japanese Patent Laid-Open No. 2021-135897 (hereinafter referred to as Document 2) discloses an information processing apparatus where the size and type of sheet loaded in each of two sheet trays are compared between the sheet trays, and if a predetermined comparison result is obtained, the selection of a type of sheet and feeding tray on a screen for setting printing conditions can be automated. However, in the information processing apparatus disclosed in Document 2, automation of the selection of a sheet size is not performed. In addition, the screen for setting printing conditions is always displayed regardless of whether or not the selection of a type of sheet and feeding tray on the screen for setting printing conditions is automated. The user needs to set the sheet size on the screen for setting such printing conditions.

SUMMARY OF THE DISCLOSURE

The present disclosure is about an image forming apparatus including: a plurality of feeding units configured to correspond to respective types of sheets; a detecting unit configured to detect whether or not a sheet is mounted in each of the feeding units; and a display control unit configured to display on a display part a preparation screen for printing on a type of sheet corresponding to one of the feeding units in a case where the type of sheet is mounted in the one of the feeding units whereas no sheet is mounted in any of other feeding units at the time a function including a printing function is selected.

Further features of the present disclosure will become apparent from the following description of exemplary embodiments with reference to the attached drawings.

DESCRIPTION OF THE EMBODIMENTS

Hereinafter, a detailed explanation is given of embodiments of the present disclosure. Note that the constituent elements described in the embodiments are presented as examples in the present disclosure, and are not intended to limit the scope of the present disclosure to those examples.

First Embodiment

Figure 1:
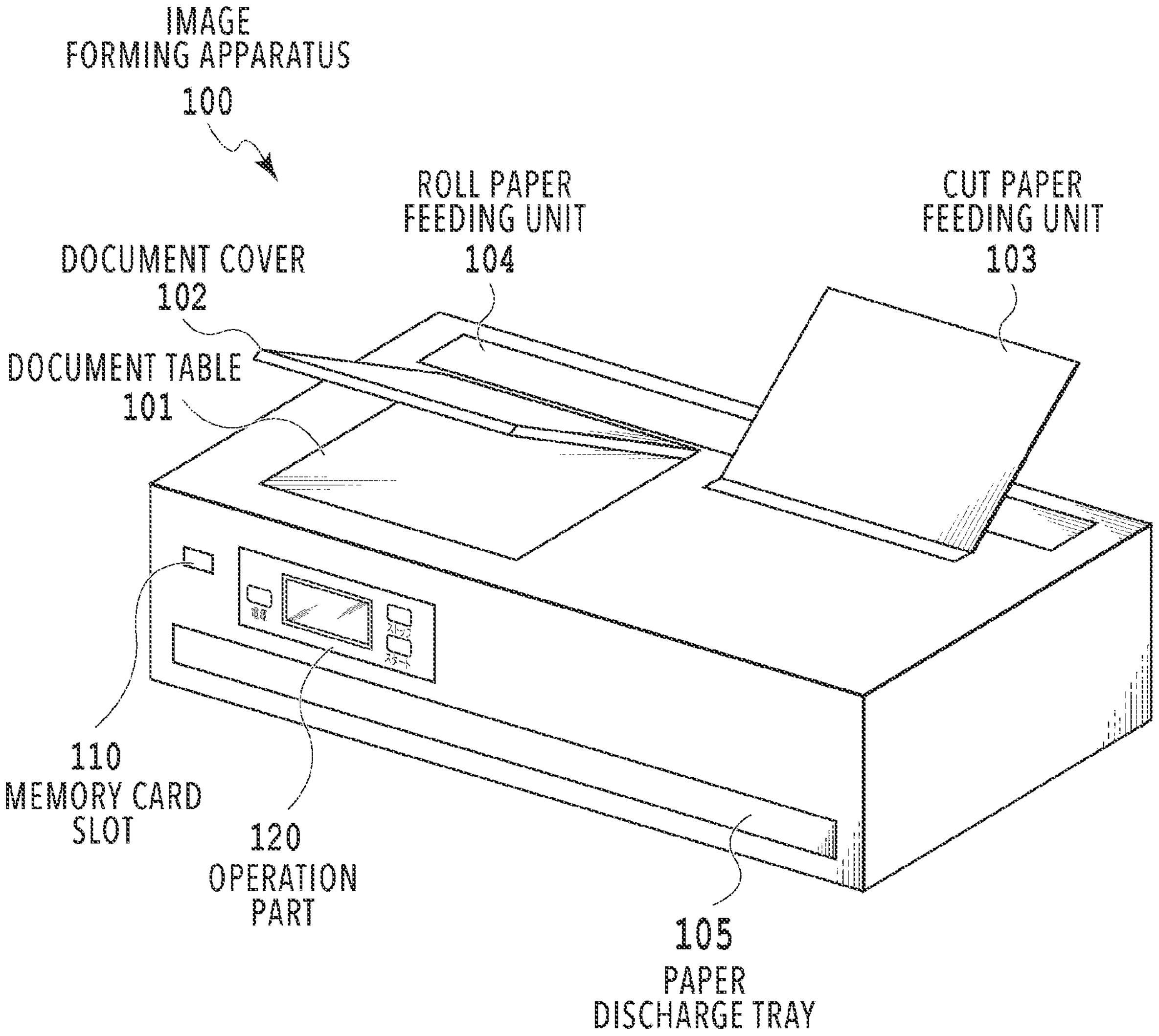
FIG. 1 is a diagram illustrating the outer appearance of an image forming apparatus.

FIG. 1 is a diagram illustrating the outer appearance of the image forming apparatus 100. In the present embodiment, an MFP (Multi Function Printer) which has an image reading function part (a scanner) is used as an example. In FIG. 1, the document table 101 is a glass-like transparent table, and is used for reading a document placed thereon with the scanner. The document cover 102 is a cover for preventing the reading light from leaking outside as reading is performed with the scanner. The cut paper feeding unit 103 is an insertion slot for setting cut paper, and the roll paper feeding unit 104 is an insertion slot for setting roll paper. It is possible to set a sheet of various sizes in each of the cut paper feeding unit 103 and the roll paper feeding unit 104, and, by utilizing both, it is possible to set both cut paper and roll paper in the image forming apparatus 100.

The cut paper feeding unit 103 is equipped with the sheet sensor 315 (see FIG. 3) for detecting the cut paper mounted by the user. A state in which the cut paper is mounted in the image forming apparatus 100 refers to a state in which the sheet sensor 315 of the cut paper feeding unit 103 recognizes the presence of cut paper. The roll paper feeding unit 104 is equipped with the sheet sensor 315 for detecting the roll paper mounted by the user. A state in which the roll paper is mounted in the image forming apparatus 100 refers to a state in which the sheet sensor 315 of the roll paper feeding unit 104 recognizes the presence of roll paper. The sheets set in the cut paper feeding unit 103 and the sheets set in the roll paper feeding unit 104 are conveyed to the printing part. After printing is executed on the sheet, the sheet is discharged from the paper discharge tray 105. The memory card slot 110 is an insertion slot for a memory card, and is used for reading image data from an inserted portable memory and executing printing based on the image data. The operation part 120 is for accepting operations by the user to input setting values and execute processing, and is installed on the apparatus outer surface of the image forming apparatus 100.

Figure 2:
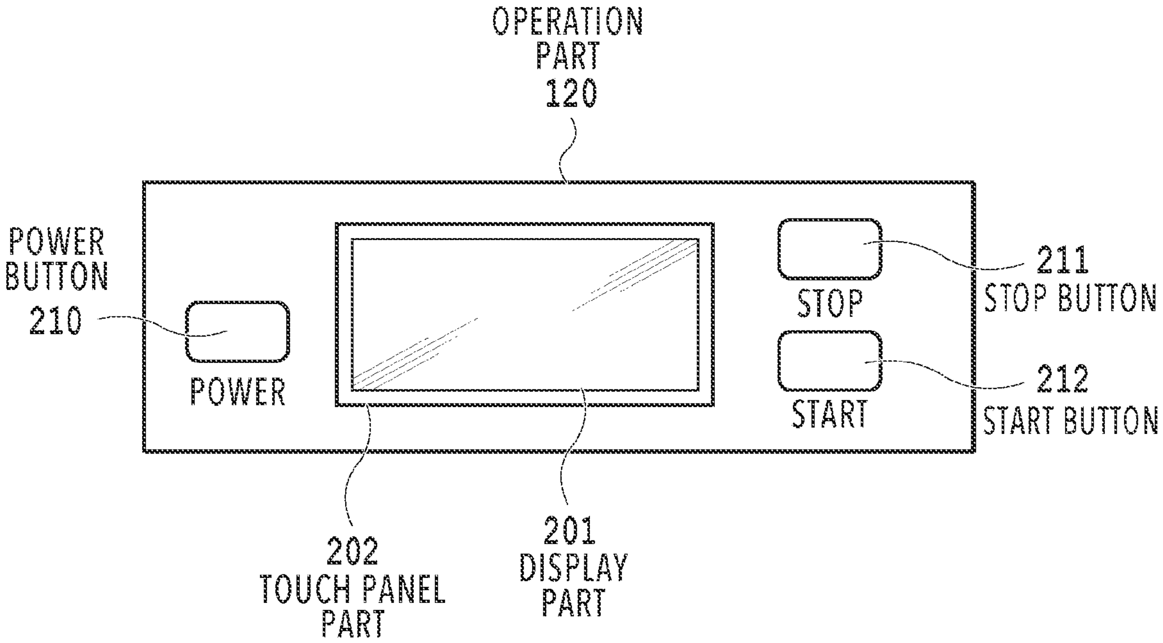
FIG. 2 is an enlarged front view of an operation part of the image forming apparatus.

FIG. 2 is an enlarged front view of the operation part 120 of the image forming apparatus 100. As illustrated in FIG. 2, the operation part 120 includes the display part 201 on which a graphical user interface (hereinafter referred to as a "GUI") is displayed, the touch panel part 202 installed for the user to operate the GUI, and the operation buttons 210, 211, and 212. The display part 201 displays the status of the image forming apparatus 100 (such as ink information and information on the mounted sheet), print setting values, a preview of an image read from a memory card, and the like. The user can utilize the touch panel part 202 to perform operations regarding the information displayed on the display part 201, and can perform changes to the print settings and the like. As the operation buttons 210, 211, and 212, the power button 210, the stop button 211, and the start button 212 are installed. Upon the user pressing the power button 210, the image forming apparatus 100 is powered on or powered off. Upon the user pressing the start button 212, an operation (such as copying or printing) of the image forming apparatus 100 is started. Upon the user pressing the stop button 211, an operation is canceled or an operation of the image forming apparatus 100 is paused.

Figure 3:
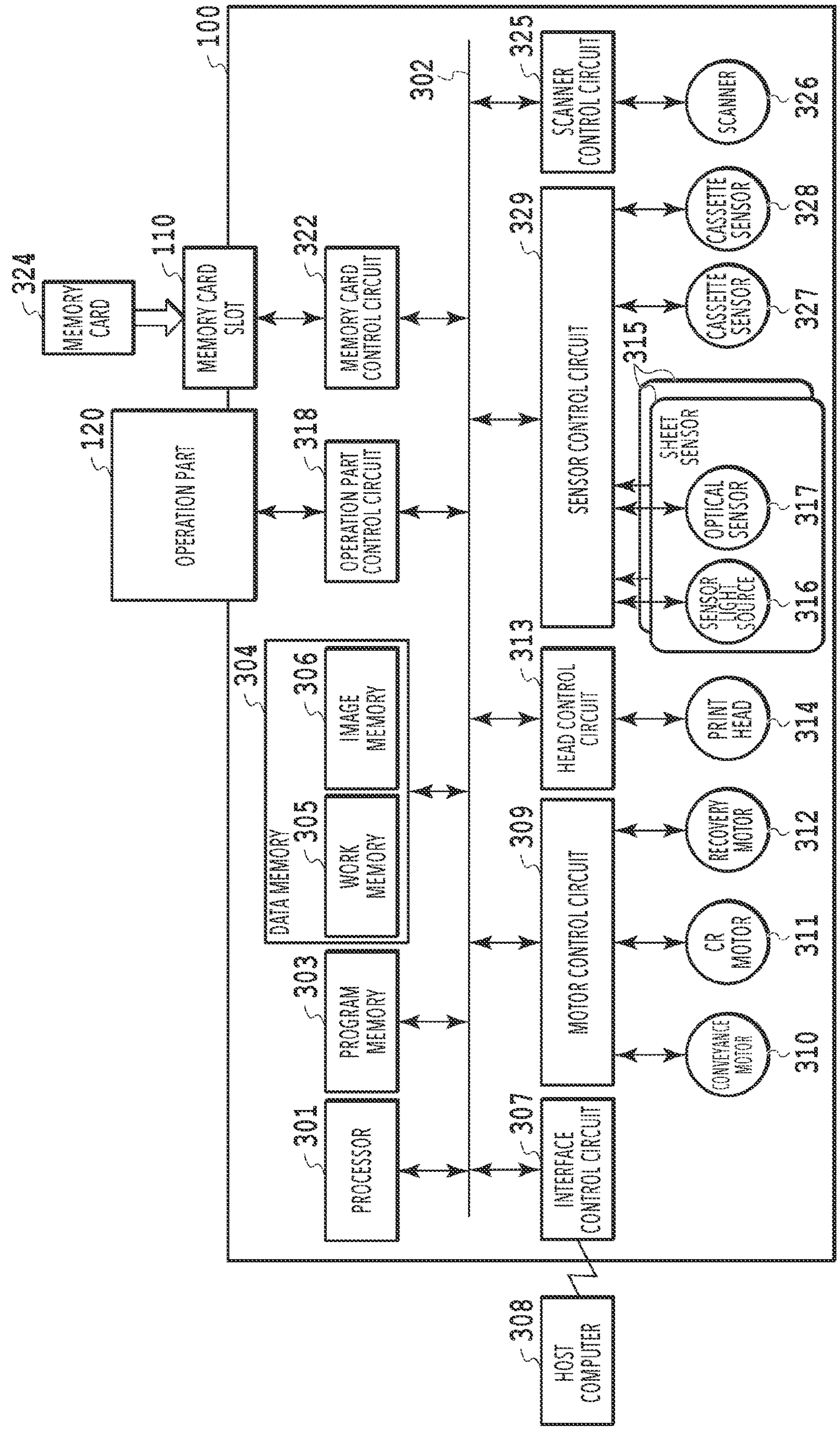
FIG. 3 is a block diagram illustrating a configuration of a control system of the image forming apparatus.

FIG. 3 is a block diagram illustrating a configuration of the control system of the image forming apparatus 100 according to the present embodiment. The microprocessor-type processor 301 operates according to programs and data stored in the ROM-type program memory 303 and the RAM-type data memory 304, which are connected via the internal bus 302. The data memory 304 includes the work memory 305 utilized for the processor 301 to execute a control program and the image memory 306 that stores the image data to be formed on a recording paper. The processor 301 controls the interface control circuit 307 and can receive job data for printing from the host computer 308 connected via an external interface. Further, the processor 301 can also notify the host computer 308 of the status of the image forming apparatus 100. The processor 301 can control various motors that drive the mechanisms of the image forming apparatus 100 via the motor control circuit 309.

The conveyance motor 310 drives a feeding roller (not illustrated in the drawings), a conveyance roller (not illustrated in the drawings), and a discharge roller (not illustrated in the drawings) to perform conveyance of the recording paper from the cut paper feeding unit 103 to the paper discharge tray 105. The carriage motor 311 (denoted as "CR MOTOR" in the present drawing) reciprocally drives a carriage (not illustrated in the drawings). Further, the recovery motor 312 drives a head recovery mechanism, and is controlled in synchronization with the drive of the carriage for execution of a recovery operation to maintain the print head 314 in an appropriate state. The processor 301 can control the print head 314 via the head control circuit 313. Image formation on the recording paper is performed by controlling the print head 314 in synchronization with the reciprocating operation of the carriage. Further, the cassette sensors 327 and 328 for the feeding unit are configured of a photo-interrupter and a mechanical switch. The cassette sensors 327 and 328 can detect that the user has set or removed sheets in/from the feeding unit of the image forming apparatus 100, and the processor 301 can acquire the detection via the sensor control circuit 329. The processor 301 controls the operation part 120 installed on the apparatus outer surface of the image forming apparatus 100 via the operation part control circuit 318.

The image forming apparatus 100 has a sheet switching part and a sheet conveyance part on the feeding side for supplying the paper selected out of the cut paper loaded in the cut paper feeding unit 103 and the roll paper loaded in the roll paper feeding unit 104 to an image forming part including the print head 314. Here, the sheet conveyance part on the feeding side includes a feeding roller and a conveyance roller. Further, the image forming apparatus 100 has a sheet conveyance part on the discharge side for conveying the selected paper from the image forming part to the discharge part. Here, the sheet conveyance part on the discharge side includes a discharge roller and a conveyance roller. Note that the sheet switching part, the sheet conveyance part on the feeding side, and the sheet conveyance part on the discharge side are not illustrated in the drawings. During a period where the sheet passes through a position sandwiched between the print head 314 and a platen (not illustrated in the drawings) in the conveyance direction (the sub scanning direction), the carriage causes the print head 314 to perform reciprocal movement in the direction (the main scanning direction) intersecting the conveyance direction over a range where the paper is arranged.

The processor 301 displays desired information on the display part 201 arranged on the operation part 120, monitors operations performed on the touch panel part 202 or the buttons 210 to 212 by the user on the same operation part 120, or the like. The processor 301 can control the scanner 326 which is not illustrated in FIG. 1 via the scanner control circuit 325, and can read the image of a document placed on the document table of the scanner 326. The processor 301 can read and write various files from/to the memory card 324 mounted in the memory card slot 110 installed on the apparatus outer surface of the image forming apparatus 100 via the memory card control circuit 322. After the image read by the scanner 326 is stored in the image memory 306 in the data memory 304, the image can be transmitted to the host computer 308 or saved as an image file in the memory card 324. Further, the image forming apparatus 100 can also be utilized as a copy machine by controlling the image forming part (not illustrated in the drawings) including the print head 314 to print based on the image read by the scanner 326.

Figure 4A:
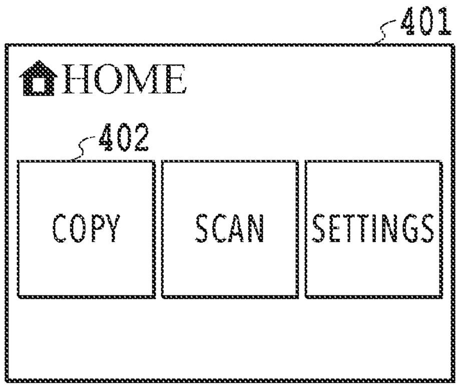
FIG. 4A to FIG. 4E are diagrams illustrating examples of a display screen of a touch panel part.

FIG. 4A to FIG. 4E are diagrams illustrating examples of the display screen of the touch panel part 202 of the image forming apparatus 100. FIG. 4A is a diagram illustrating an example of the home screen 401. The home screen 401 is displayed as the image forming apparatus 100 is in a standby state, and menu buttons are installed for executing functions of the image forming apparatus 100. In the example of FIG. 4A, the copy button 402 is installed on the home screen 401. The copy button 402 is a button for activating the copy function in which the scan function and the print function equipped in the image forming apparatus 100 run together. If the user presses the copy button 402 on the home screen 401 in a case where both the roll paper and the cut paper are mounted in the image forming apparatus 100, the processor 301 causes the home screen 401 to transition to the later-described feeding port selection screen 403.

Figure 4B:
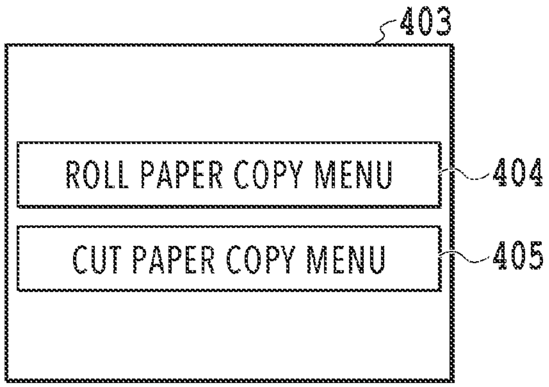

FIG. 4B is a diagram illustrating an example of the feeding port selection screen 403. The feeding port selection screen 403 is displayed by the processor 301 in a case where the user presses the copy button 402 on the home screen 401 in a case where both the roll paper and the cut paper are mounted in the image forming apparatus 100. On the feeding port selection screen 403, buttons are installed for transitioning to the copy menu screens corresponding to the respective feeding ports. In the example of FIG. 4B, the button 404 for transitioning to the roll paper copy menu and the button 405 for transitioning to the cut paper copy menu are installed on the feeding port selection screen 403. If the user presses the button 404 for transitioning to the roll paper copy menu on the feeding port selection screen 403, the processor 301 causes the feeding port selection screen 403 to transition to the later-described roll paper copy menu screen 406. On the other hand, if the user presses the button 405 for transitioning to the cut paper copy menu on the feeding port selection screen 403, the processor 301 causes the feeding port selection screen 403 to transition to the later-described cut paper copy menu screen 409.

Figure 4C:
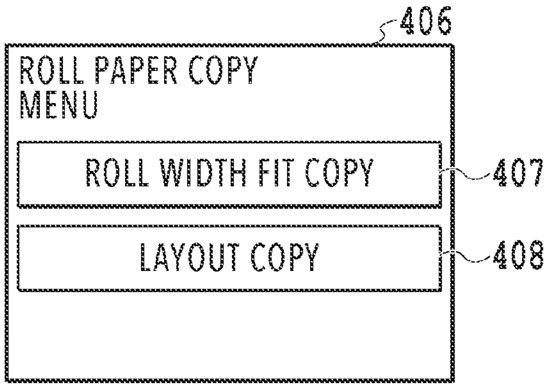

FIG. 4C is a diagram illustrating an example of the roll paper copy menu screen 406. The roll paper copy menu screen 406 is displayed by the processor 301 if the user presses the button 404 for transitioning to the roll paper copy menu on the feeding port selection screen 403. Further, the roll paper copy menu screen 406 is also displayed by the processor 301 if the user presses the copy button 402 on the home screen 401 in a case where only the roll paper is mounted in the image forming apparatus 100. Buttons for selecting the copy format of the roll paper are installed on the roll paper copy menu screen 406. As an example, the roll width fit copy button 407 and the layout copy button 408 are installed on the roll paper copy menu screen 406 illustrated in FIG. 4C. The roll paper copy menu screen 406 is positioned as a preparation screen for copying onto the roll paper. Further, roll width fit copy and layout copy are examples of printing formats, and thus the roll paper copy menu screen 406 is also positioned as a screen for selecting the printing format.

Figure 4D:
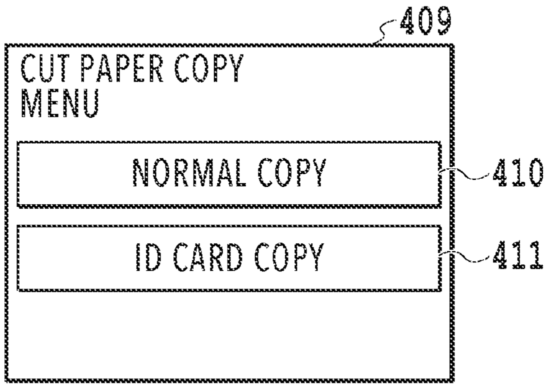

FIG. 4D is a diagram illustrating an example of the cut paper copy menu screen 409. The cut paper copy menu screen 409 is displayed by the processor 301 if the user presses the button 405 for transitioning to the cut paper copy menu on the feeding port selection screen 403. Further, the cut paper copy menu screen 409 is also displayed by the processor 301 if the user presses the copy button 402 on the home screen 401 in a case where only the cut paper is mounted in the image forming apparatus 100. Buttons for selecting the copy format of the cut paper are installed on the cut paper copy menu screen 409. As an example, the normal copy button 410 and the ID card copy button 411 are installed on the cut paper copy menu screen 409 illustrated in FIG. 4D. The cut paper copy menu screen 409 is positioned as a preparation screen for copying onto the cut paper. Further, normal copy and ID card copy are examples of printing formats, and thus the cut paper copy menu screen 409 is also positioned as a screen for selecting the printing format.

Figure 4E:
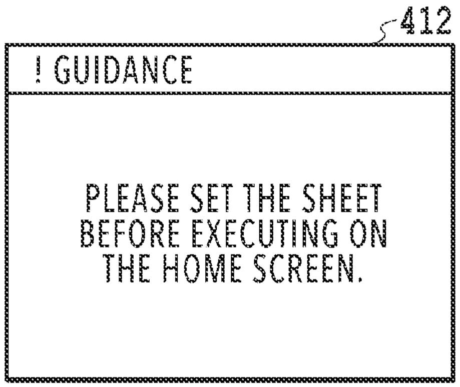

FIG. 4E is a diagram illustrating an example of the guidance screen 412 prompting setting of sheets. The sheet setting guidance screen 412 is displayed by the processor 301 if the user presses the copy button 402 on the home screen 401 in a state where neither the roll paper nor the cut paper is mounted in the image forming apparatus 100. The sheet setting guidance screen 412 displays a message prompting the user to mount the roll paper or the cut paper into the image forming apparatus 100. In the example in FIG. 4E, the message "PLEASE SET THE SHEETS BEFORE EXECUTING ON THE HOME SCREEN." is displayed. By displaying such a message, it is possible to have the effect of making the user aware that no sheet is mounted in the image forming apparatus 100. The sheet setting guidance screen 412 is automatically transitioned to the home screen 401 by the processor 301 if a predetermined time period (for example, 3 seconds) has elapsed from displaying the sheet setting guidance screen 412.

With reference to FIG. 4C, if the user presses the roll width fit copy button 407 on the roll paper copy menu screen 406, the processor 301 transitions the roll paper copy menu screen 406 to a standby screen (not illustrated in the drawings) for roll paper fit copying. If the user presses a button on the standby screen or the start button 212 while the standby screen is displayed, the scanner 326 reads the document placed on the document table 101 under the control of the processor 301. Then, under the control of the processor 301, a copy of the document is printed on the roll paper in the roll width fit size by the image forming part including the print head 314.

If the user presses the layout copy button 408 on the roll paper copy menu screen 406, the processor 301 transitions the roll paper copy menu screen 406 to a standby screen (not illustrated in the drawings) for layout copying. If the user presses a button on the standby screen or the start button 212 while the standby screen is displayed, the scanner 326 reading a document placed on the document table 101 is repeated several times under the control of the processor 301. Then, under the control of the processor 301, a copy of the multiple documents in the layout copy size is printed on the roll paper by the image forming part including the print head 314. For example, if the user presses a button on the standby screen while the standby screen is displayed, the scanner 326 reading a document placed on the document table 101 may be repeated twice under the control of the processor 301. Then, under the control of the processor 301, a copy of the two documents at a ½ size reduction is printed on the roll paper by the image forming part including the print head 314.

With reference to FIG. 4D, if the user presses the normal copy button 410 on the cut paper copy menu screen 409, the processor 301 transitions the cut paper copy menu screen 409 to a standby screen (not illustrated in the drawings) for normal copying. If the user presses a button on the standby screen or the start button 212 while the standby screen is displayed, the scanner 326 reads the document placed on the document table 101 under the control of the processor 301. Then, under the control of the processor 301, a copy of the document in a normal size is printed on the cut paper by the image forming part including the print head 314.

If the user presses the ID card copy button 411 on the cut paper copy menu screen 409, the processor 301 transitions the cut paper copy menu screen 409 to a standby screen (not illustrated in the drawings) for ID card copying. If the user presses a button on the standby screen or the start button 212 while the standby screen is displayed, the scanner 326 reads the ID card placed on the document table 101 under the control of the processor 301. Then, under the control of the processor 301, a copy of the ID card in the size of the ID card is printed on the cut paper by the image forming part including the print head 314.

Figure 5:
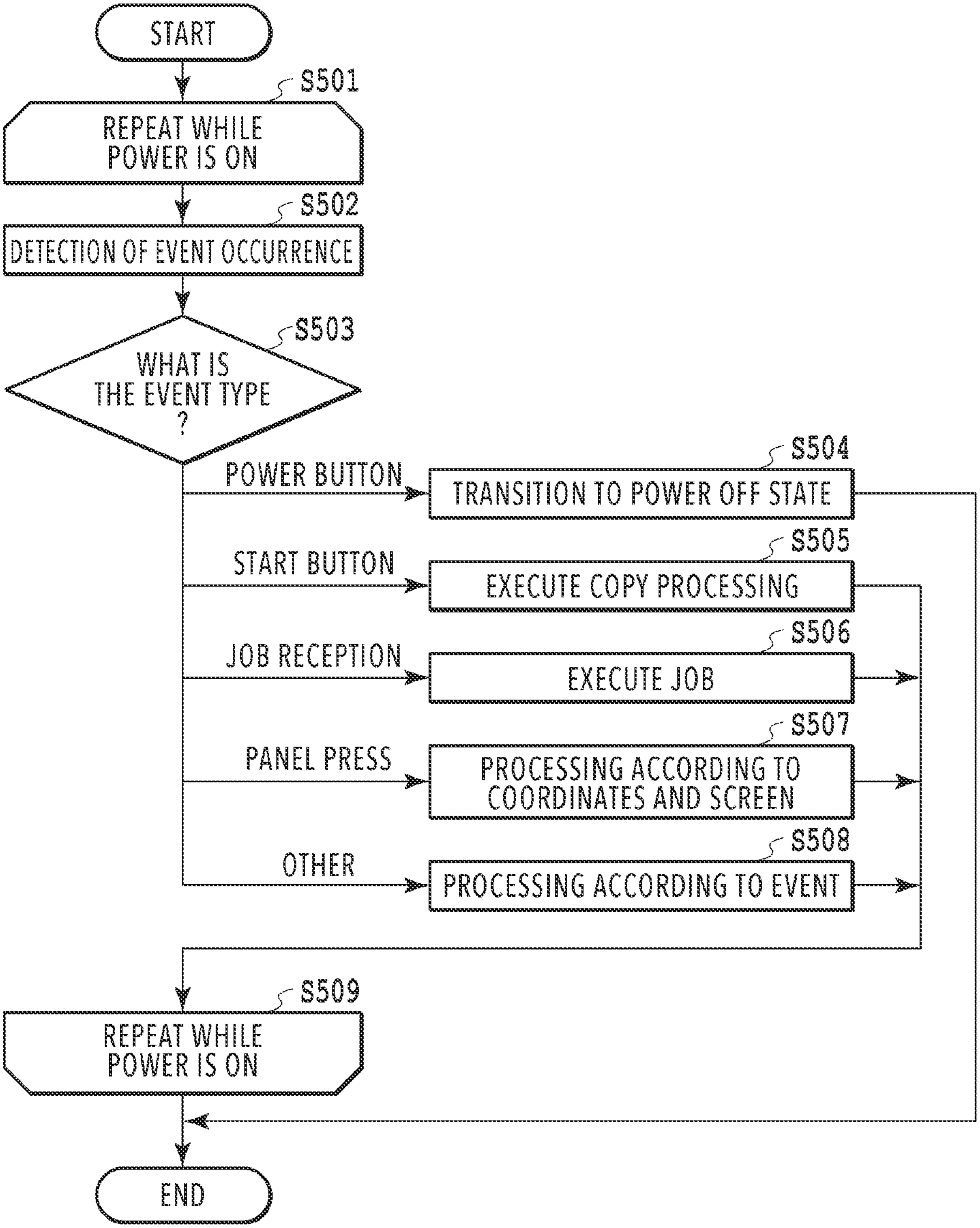
FIG. 5 is a flowchart illustrating details of processing of the image forming apparatus.

FIG. 5 is a flowchart illustrating processing executed by the image forming apparatus 100. This processing is executed by the processor 301 of the image forming apparatus 100 once the image forming apparatus 100 is powered on, and, while the image forming apparatus 100 is powered on, the processing in steps S501 to S509 is executed repeatedly. Note that, in the following, "Step S . . . " is abbreviated to "S . . . ". In S502 at the beginning of each repetition, the processor 301 detects the occurrence of an event. Here, the events that the processor 301 detects in S502 are not only events that occur due to the user pressing a button installed on the screens displayed on the display part 201. The events that the processor 301 detects in S502 also include events that occur due to the user pressing the buttons 210, 212, and 212 installed on the operation part 120. Once the processor 301 detects the occurrence of an event in S502, the processor 301 determines the type of event in S503 that follows, and switches the processing to be executed next according to the type of event.

If the event determined in S503 is a press of the power button 210, the processor 301 proceeds the processing to S504 and switches the image forming apparatus 100 from the power-on state to the power-off state. Next, the processor 301 causes the processing to exit the repeating loop. As a result, the image forming apparatus 100 remains in the power-off state until the next operation to power-on is performed.

If the event determined in S503 is a press of the start button 212, the processor 301 proceeds the processing to S505 and executes copy processing. In other words, as described above, if the standby screen for roll paper fit copying is currently displayed, roll paper fit copying is executed. Further, if the standby screen for layout copying is currently displayed, layout copying is executed. Furthermore, if the standby screen for normal copying is currently displayed, normal copying is executed. Furthermore, if the standby screen for ID card copying is currently displayed, ID card copying is executed. Note that, if the standby screen for scanning is currently displayed, scanning is executed.

If the event determined in S503 is a reception of a job from the outside, the processor 301 proceeds the processing to S506 and executes a job according to the contents of the received job.

If the event determined in S503 is a press of the touch panel part 202, the processor 301 proceeds the processing to S507 and performs processing according to the pressed coordinates of the touch panel part 202 and the screen displayed at the time of pressing. For example, as described above, the screen may be transitioned or the functions of the image forming apparatus 100 may be operated in accordance with the buttons pressed on the various screens illustrated in FIG. 4A to FIG. 4E.

If the event determined in S503 is another event, the processor 301 proceeds the processing to S508 and executes the processing corresponding to the event.

Figure 6:
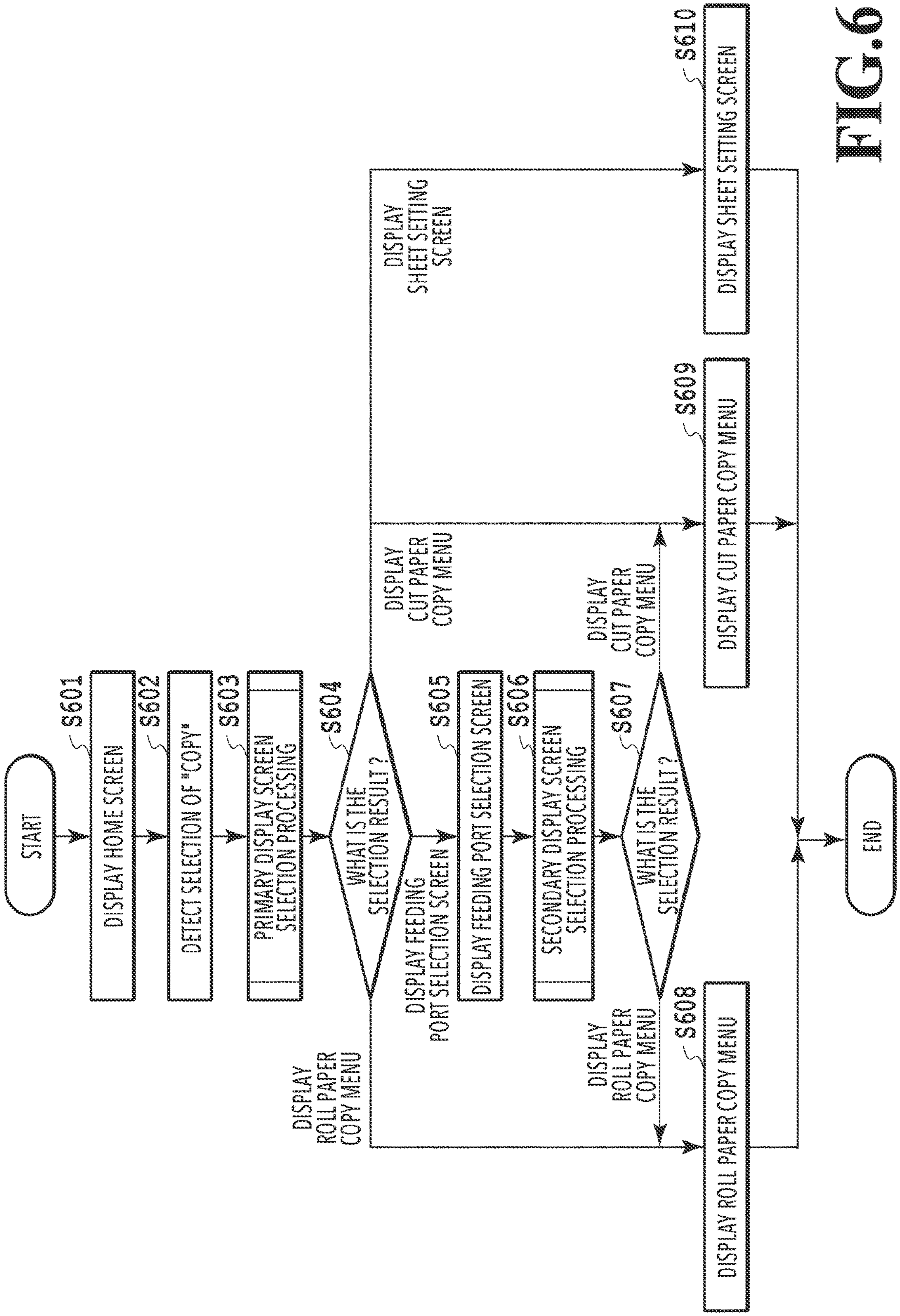
FIG. 6 is a main flowchart illustrating display control processing.

FIG. 6 is a main flowchart illustrating the display control processing in a case where the user presses the copy button 402 on the home screen 401. In this processing, the user is made to select the function to be executed by the image forming apparatus 100, but the screen to be displayed is switched depending on the mounting status of the sheets in the image forming apparatus 100. The display control processing illustrated in FIG. 6 is implemented by the processor 301 executing a program stored in the program memory 303. Therefore, it can be said that the processor 301 is a display control unit.

First, once the power of the image forming apparatus 100 is turned on, the processor 301 causes the display part 201 to display the home screen 401 in S601. Next, in S602, the processor 301 detects that the copy button 402 is pressed by the user. Next, in S603, the processor 301 performs the primary display screen selection processing. This processing is described later using FIG. 7. Note that the selection result in S603 is any one of "SELECT FEEDING PORT SELECTION SCREEN", "SELECT ROLL PAPER COPY MENU SCREEN", "SELECT CUT PAPER COPY MENU SCREEN", and "SELECT SHEET SETTING GUIDANCE SCREEN". Next, in S604, the processor 301 branches the processing to any one of S605, S608, S609, and S610 depending on the selection result in S603 immediately before.

If the selection result in S603 is "SELECT ROLL PAPER COPY MENU SCREEN", the processor 301 proceeds the processing from S604 to S608 and causes the display part 201 to display the roll paper copy menu screen 406.

If the selection result in S603 is "SELECT CUT PAPER COPY MENU SCREEN", the processor 301 proceeds the processing from S604 to S609 and causes the display part 201 to display the cut paper copy menu screen 409.

If the selection result in S603 is "SELECT SHEET SETTING GUIDANCE SCREEN", the processor 301 proceeds the processing from S604 to S610 and causes the display part 201 to display the sheet setting guidance screen 412.

If the selection result in S603 is "SELECT FEEDING PORT SELECTION SCREEN", the processor 301 proceeds the processing from S604 to S605. In S605, the processor 301 causes the display part 201 to display the feeding port selection screen 403. Next, in S606, the processor 301 performs the secondary display screen selection processing. This processing is described later using FIG. 8. Note that the selection result in S606 is either "SELECT ROLL PAPER COPY MENU SCREEN" or "SELECT CUT PAPER COPY MENU SCREEN". Next, in S607, the processor 301 branches the processing to either S608 or S609 depending on the selection result in S606 immediately before.

If the selection result in S606 is "SELECT ROLL PAPER COPY MENU SCREEN", the processor 301 proceeds the processing from S607 to S608 and causes the display part 201 to display the roll paper copy menu screen 406.

If the selection result in S606 is "SELECT CUT PAPER COPY MENU SCREEN", the processor 301 proceeds the processing from S607 to S609 and causes the display part 201 to display the cut paper copy menu screen 409.

Figure 7:
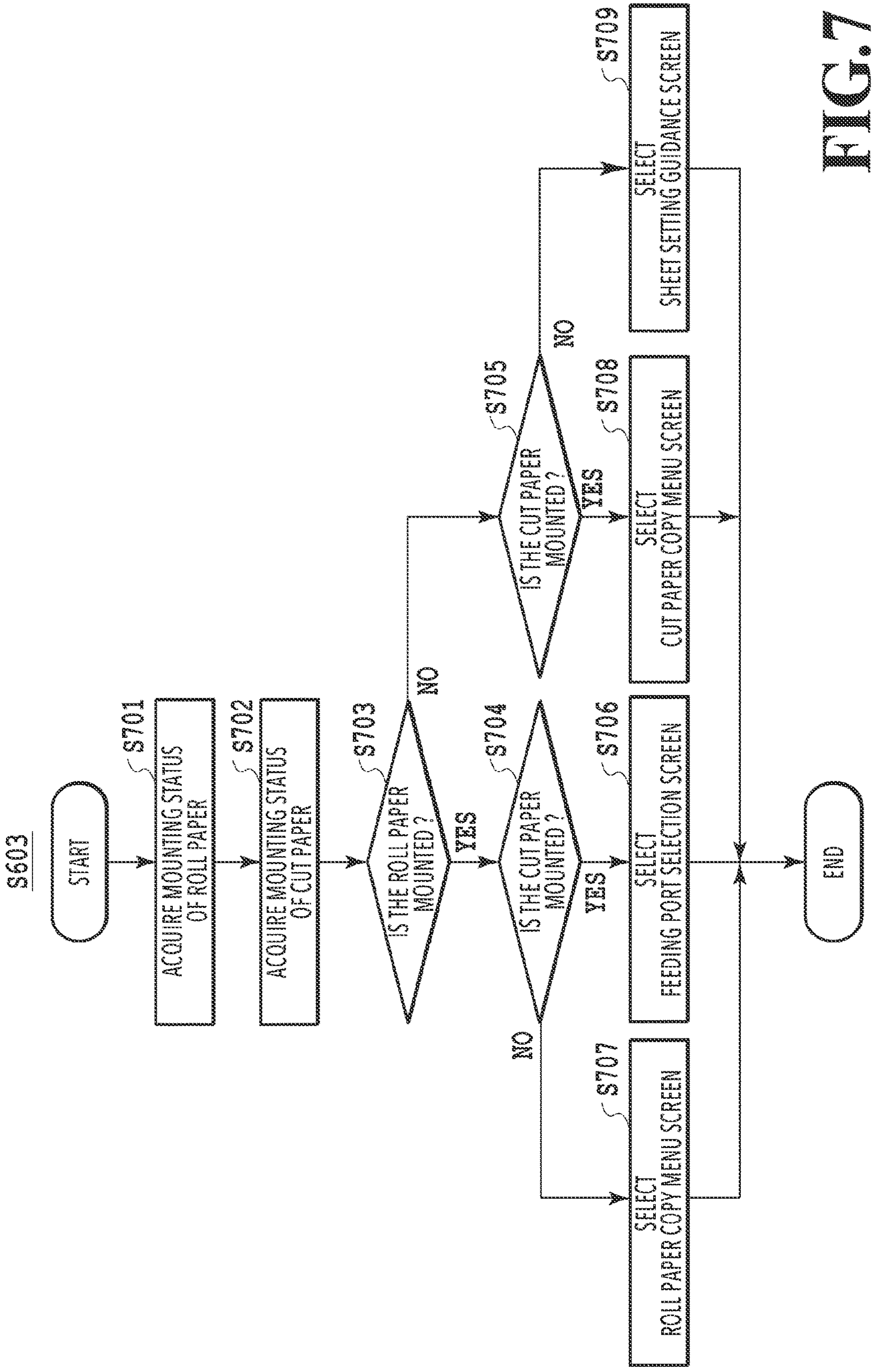
FIG. 7 is a flowchart illustrating copy menu display determination processing.

FIG. 7 is a flowchart illustrating the primary display screen selection processing. The primary display screen selection processing is processing for acquiring the mounting status of the sheets and selecting the screen to be displayed on the display part 201 based on the mounting status of the sheets. This processing is executed as a subflow of S603 included in the flow illustrated in FIG. 6. Note that "YES" and "NO" written in the conditional branches in FIG. 7 indicates "present" and "absent" for mounted sheets, respectively.

First, in S701, the processor 301 acquires the mounting status of the roll paper. The mounting status of the roll paper is acquired from the sheet sensor 315 of the roll paper feeding unit 104. Next, in S702, the processor 301 acquires the mounting status of the cut paper. The mounting status of the cut paper is acquired from the sheet sensor 315 of the cut paper feeding unit 103. After acquiring the mounting status of each sheet, the processor 301 performs the processing described below according to the acquired results.

In S703, the processor 301 acts according to the determination result in S701. If the processor 301 determines in S701 that the mounting status of the roll paper is "present", the processing proceeds to S704. On the other hand, if the processor 301 determines in S701 that the mounting status of the roll paper is "absent", the processing proceeds to S705.

In S704, the processor 301 acts according to the determination result in S702. If the processor 301 determines in S702 that the mounting status of the cut paper is "present", the processing proceeds to S706. On the other hand, if the processor 301 determines in S702 that the mounting status of the cut paper is "absent", the processing proceeds to S707.

In S705, the processor 301 acts according to the determination result in S702. If the processor 301 determines in S702 that the mounting status of the cut paper is "present", the processing proceeds to S708. On the other hand, if the processor 301 determines in S702 that the mounting status of the cut paper is "absent", the processing proceeds to S709.

In S706, the processor 301 selects the feeding port selection screen. In S707, the processor 301 selects the roll paper copy menu screen. In S708, the processor 301 selects the cut paper copy menu screen. In S709, the processor 301 selects the sheet setting guidance screen.

That is, if the mounting status of the roll paper is "present" and the mounting status of the cut paper is also "present", the processor 301 selects the feeding port selection screen. Further, if the mounting status of the roll paper is "present" and the mounting status of the cut paper is "absent", the processor 301 selects the roll paper copy menu screen. Furthermore, if the mounting status of the roll paper is "absent" and the mounting status of the cut paper is "present", the processor 301 selects the cut paper copy menu screen. Furthermore, if the mounting status of the roll paper is "absent" and mounting status of the cut paper is also "absent", the processor 301 selects the sheet setting guidance screen.

Figure 8:
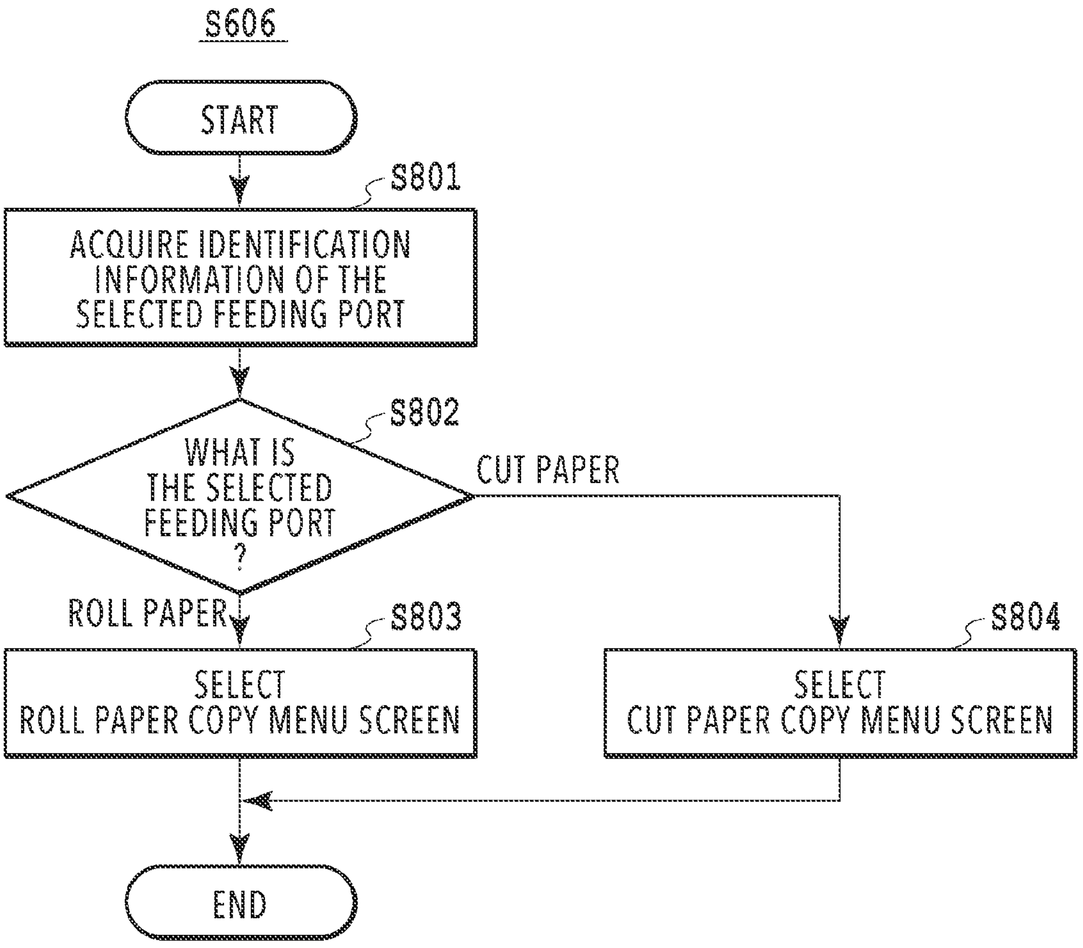
FIG. 8 is a flowchart illustrating feeding port selection state determination processing.

FIG. 8 is a flowchart illustrating the secondary display screen selection processing. The secondary display screen selection processing is processing for selecting which of the roll paper copy menu screen 406 and the cut paper copy menu screen 409 to display following the feeding port selection screen 403. If the user presses the roll paper copy menu 404 on the feeding port selection screen 403, the roll paper copy menu screen 406 is displayed next. On the other hand, if the user presses the cut paper copy menu 405 on the feeding port selection screen 403, the cut paper copy menu screen 409 is displayed next. The secondary display screen selection processing is executed as a sub-flow of S606 included in the flow illustrated in FIG. 6.

First, in S801, the processor 301 acquires the identification information for the feeding port selected by the user on the feeding port selection screen 403. As the identification information for the feeding port, for example, either the identification information for the roll paper copy menu 404 or the identification information for the cut paper copy menu 405 is utilized. Therefore, if the user presses the roll paper copy menu 404 on the feeding port selection screen 403, the processor 301 acquires the identification information for the roll paper copy menu 404 as the identification information for the roll paper. On the other hand, if the user presses the cut paper copy menu 405 on the feeding port selection screen 403, the processor 301 acquires the identification information for the cut paper copy menu 405 as the identification information for the cut paper.

Next, in S802, the processor 301 determines which of the feeding port for the roll paper and the feeding port for the cut paper is selected, based on the identification information acquired in S801.

If the processor 301 determines that the feeding port for the roll paper is selected, the processing proceeds from S802 to S803. On the other hand, if the processor 301 determines that the feeding port for the cut paper is selected, the processing proceeds from S802 to S804.

In S803, the processor 301 selects the roll paper copy menu screen 406. On the other hand, in S804, the processor 301 selects the cut paper copy menu screen 409.

As described above, according to the present embodiment, the user can execute the copy function of printing on the desired sheet with the minimum number of operations, thereby improving the user's productivity.

Second Embodiment

As the second embodiment of the present disclosure, an explanation is herein given of a form in which a setting for hiding the feeding port selection screen 403 can be performed. In the first embodiment, the processor 301 always displays the feeding port selection screen 403 in a case where the copy button 402 is pressed on the home screen 401 in a state where both the roll paper and the cut paper are mounted in the image forming apparatus 100. Further, in the first embodiment, the processor 301 waits for the user to press either the roll paper copy menu 404 or the cut paper copy menu 405 on the feeding port selection screen 403.

However, even if both the roll paper and the cut paper are mounted in the image forming apparatus 100, there are situations in which the user desires to print only on one of the roll paper and the cut paper. The feeding port selection screen 403 is an unnecessary screen for a user who wishes to print only on one of the roll paper and the cut paper, and operations on the screen are an unnecessary burden.

The second embodiment is a countermeasure to such a situation. That is, in the second embodiment, the user can set whether or not the image forming apparatus 100 displays the feeding port selection screen 403. This setting is referred to as the display setting for the feeding port selection screen. The display setting for the feeding port selection screen includes a setting regarding which copy menu is displayed after "COPY" is selected on the home screen in a state where the feeding port selection screen is set to be hidden. Here, which copy menu to display corresponds to which of the roll paper copy menu screen 406 and the cut paper copy menu screen 409 to display. With this setting, even in a state where both the roll paper and the cut paper are mounted in the image forming apparatus, operations on the feeding port selection screen 403 can be omitted, thereby allowing a direct transition to the copy menu screen desired by the user from the home screen 401. Accordingly, in the second embodiment, the number of screen operations by the user who wants to print only on one of the roll paper and the cut paper is reduced, thereby making it possible to improve productivity.

Figure 9A:
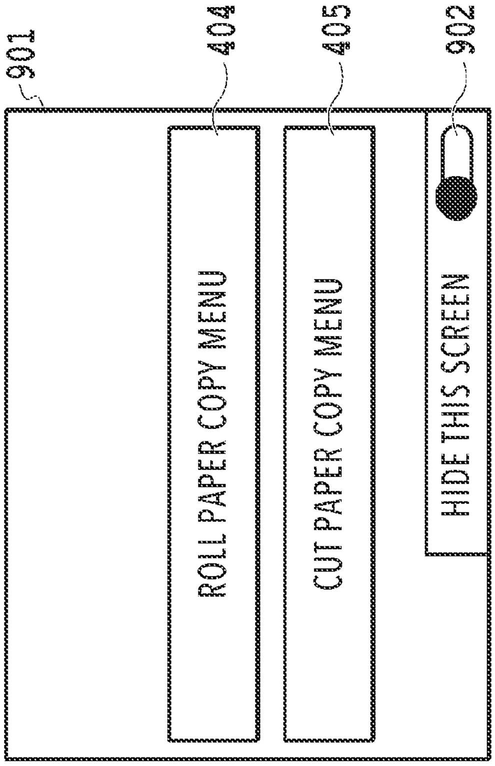
FIG. 9A to FIG. 9C are diagrams illustrating examples of a display screen of the touch panel part.
Figure 9B:
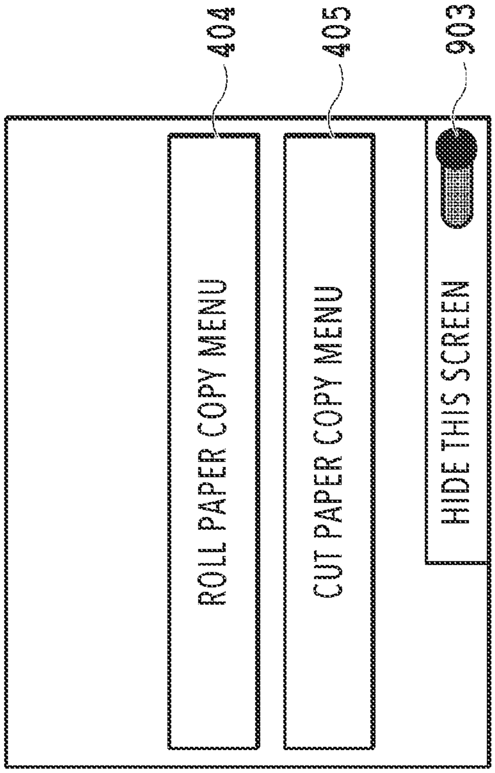
Figure 9C:
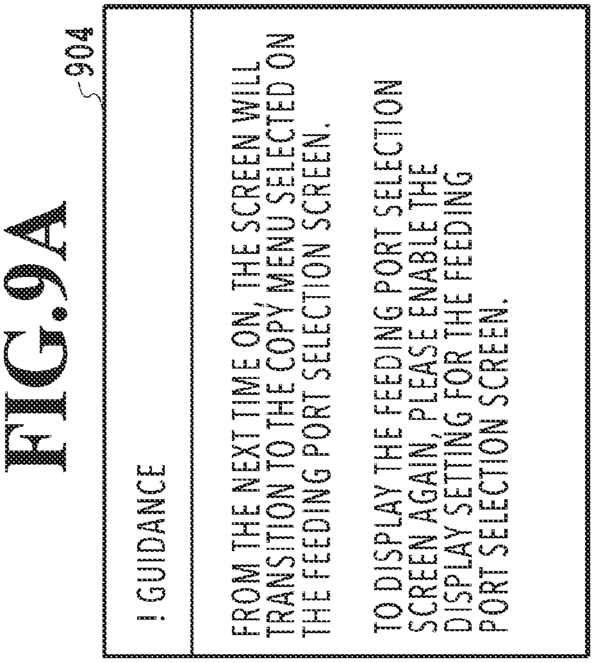

FIG. 9A to FIG. 9C are diagrams illustrating examples of the display screen of the touch panel part 202 of the image forming apparatus 100. FIG. 9A is a diagram illustrating an example in which the hide setting is OFF on the feeding port selection screen 901. The feeding port selection screen 901 is displayed if the copy button 402 on the home screen 401 is pressed in a state where both the roll paper and the cut paper are mounted in the image forming apparatus 100, similarly to the feeding port selection screen 403 illustrated in FIG. 2B. In addition to the function of the feeding port selection screen 403, the feeding port selection screen 901 accepts input to hide the feeding port selection screen 901. The purpose of making it possible to hide the feeding port selection screen 901 is to enable direct transitioning to either the roll paper copy menu screen 406 or the cut paper copy menu screen 409 from the home screen 401 even in a state where both the roll paper and the cut paper are mounted in the image forming apparatus 100. This reduces the number of screen operations by the user and can be expected to have the effect of improving productivity.

As described above, the toggle switch 902 illustrated in FIG. 9A corresponds to a case where the hide setting is OFF. Note that the initial value of the toggle switch 902 is OFF. If the user presses the toggle switch 902 on the screen illustrated in FIG. 9A, the screen illustrated in FIG. 9A transitions to the screen illustrated in FIG. 9B via the later-described guidance screen 904. The toggle switch 903 is ON in the screen illustrated in FIG. 9B. On the contrary, if the user presses the toggle switch 903 on the screen illustrated in FIG. 9B, the screen illustrated in FIG. 9B directly transitions to the screen illustrated in FIG. 9A. The toggle switch 902 can be switched ON/OFF before closing the screen illustrated in FIG. 9A or FIG. 9B. FIG. 9C is a diagram illustrating an example of the guidance screen 904 in a case of hiding the feeding port selection screen.

The guidance screen 904 is displayed if the toggle switch 902 is pressed on the screen 901 illustrated in FIG. 9A. The guidance message displayed on the guidance screen 904 is for notifying the user that the screen 901 will not be displayed from the next time onwards even if both the roll paper and the cut paper are mounted in the image forming apparatus 100. In other words, the guidance message is to notify the user that, from the next time onwards, in a case where both types of sheets are mounted in the image forming apparatus 100, if the copy button 402 is pressed, the home screen 401 transitions to the copy menu screen of the sheet selected on the screen 901 immediately before. In the example illustrated in FIG. 9, this guidance message reads, "FROM THE NEXT TIME ON, THE SCREEN WILL TRANSITION TO THE COPY MENU SELECTED ON THE FEEDING PORT SELECTION SCREEN. TO DISPLAY THE FEEDING PORT SELECTION SCREEN AGAIN, PLEASE ENABLE THE DISPLAY SETTING FOR THE FEEDING PORT SELECTION SCREEN." Three seconds after being displayed, the guidance screen 904 automatically transitions to the feeding port selection screen 901 illustrated in FIG. 9B.

As already explained above, the toggle switch 902 can be switched ON/OFF before closing the screen 901 illustrated in FIG. 9A or FIG. 9B. Here, the screen 901 is closed by pressing the button 404 for transitioning to the roll paper copy menu or the button 405 for transitioning to the cut paper copy menu. Therefore, the toggle switch 902 can be switched ON/OFF if it is before the button 404 for transitioning to the roll paper copy menu or the button 405 for transitioning to the cut paper copy menu on the screen 901 is pressed.

Note that, after switching the toggle switch 902 to ON, once the feeding port selection screen 901 is closed, the feeding port selection screen 901 will no longer be displayed. Therefore, the user is no longer able to switch the toggle switch 902 to OFF on the feeding port selection screen 901. However, as can be understood from the explanatory message displayed on the guidance screen 904, the user can put the toggle switch 902 back to OFF on the screen of display setting for the feeding port selection screen (not illustrated in the drawings).

Figure 10:
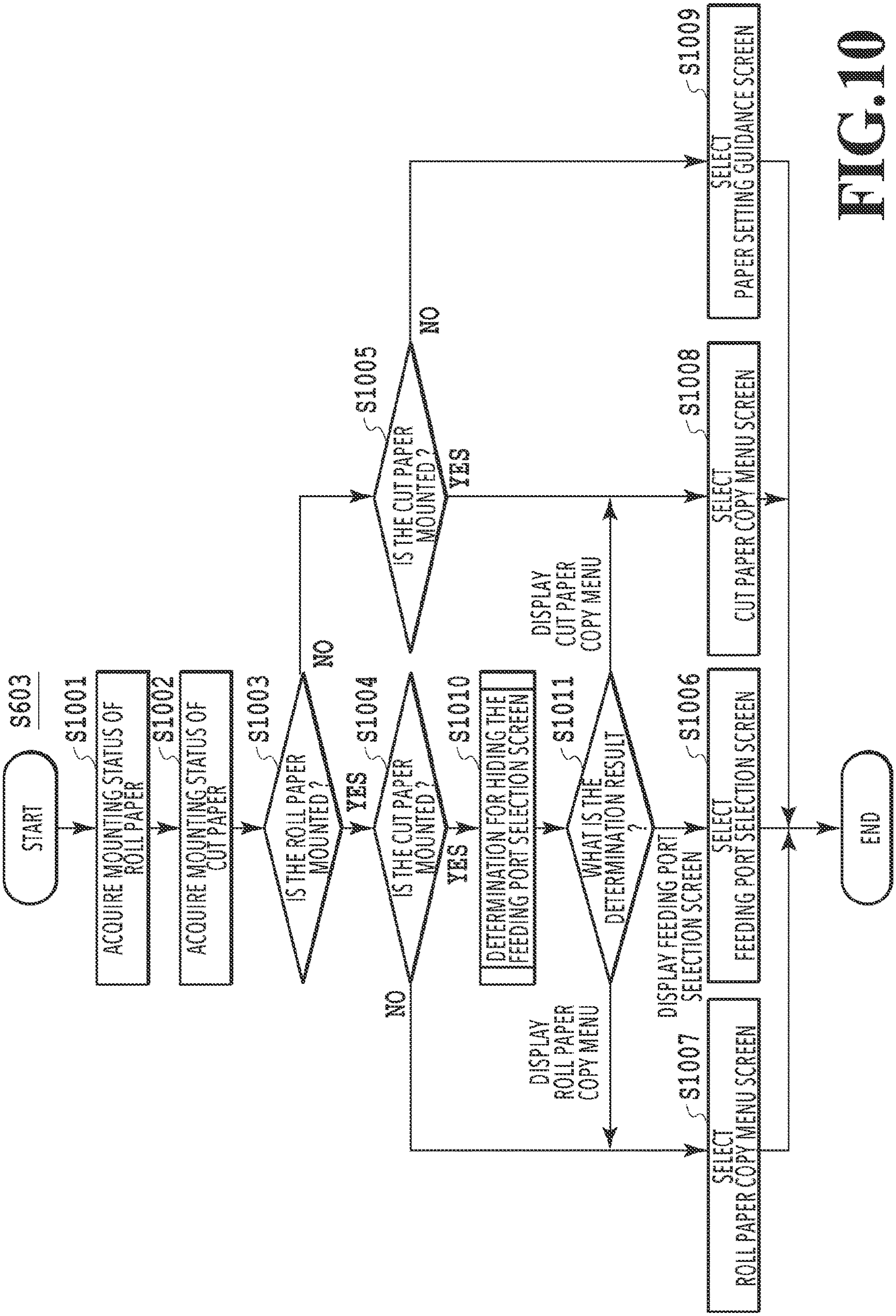
FIG. 10 is a flowchart illustrating copy menu display determination processing.

FIG. 10 is a flowchart illustrating the copy menu display determination processing. The copy menu display determination processing in FIG. 10 is processing for acquiring the mounting status of the sheets and deciding the next screen to be displayed in accordance with the determination for hiding the selection screen. This processing is executed as a sub-flow of S603 included in the flow illustrated in FIG. 6. In the present drawing, the processing from S1001 to S1009 is the same as the processing from S701 to S709, respectively, and thus the explanation thereof is omitted here. If the processor 301 determines in S1004 that the mounted cut paper is "present", the determination for hiding the selection screen is performed in S1010. Details of S1010 are described later. In S1011, the processor 301 branches the processing as follows depending on the determination result in S1010. That is, in a case where the determination result in S1010 indicates "DISPLAY SELECTION SCREEN", the processor 301 proceeds the processing to S1006 and displays the feeding port selection screen 901. Further, in a case where the determination result in S1010 indicates "DISPLAY ROLL PAPER MENU", the processor 301 proceeds the processing to S1007 and displays the roll paper copy menu screen 406. Furthermore, in a case where the determination result in S1010 indicates "DISPLAY CUT PAPER MENU", the processor 301 proceeds the processing to S1008 and displays the cut paper copy menu screen 409.

Figure 11:
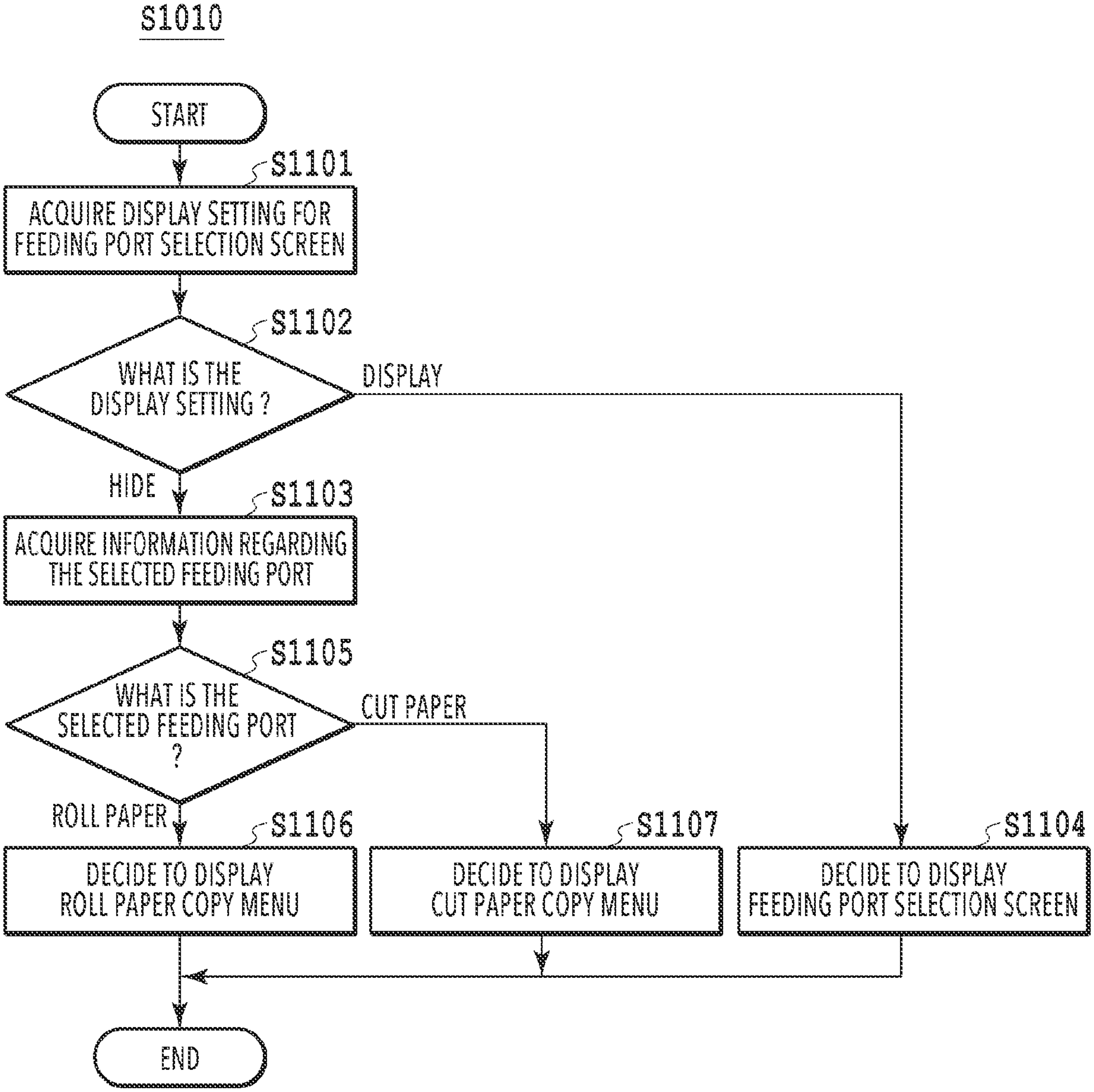
FIG. 11 is a flowchart illustrating determination processing for hiding the feeding port selection screen.

FIG. 11 is a flowchart illustrating the determination processing for hiding the feeding port selection screen. The determination processing for hiding the feeding port selection screen is processing for determining whether or not to display the feeding port selection screen and deciding the screen to be displayed next. This processing is executed as a sub-flow of S1010 included in the flow illustrated in FIG. 10. In S1101, the processor 301 acquires the display setting for the feeding port selection screen. This setting value refers to the setting value saved in S1208 of the flowchart in the later-described FIG. 12. If the acquired result is "HIDE" in S1102, the processor 301 executes S1103. In S1103, the processor 301 acquires information regarding the selected feeding port. The information regarding the selected feeding port refers to the information saved in S1207 of the flowchart in the later-described FIG. 12. The following processing is executed depending on the selected feeding port. In a case where the selected feeding port is "ROLL PAPER" in S1105, the processor 301 decides to display the copy menu of the roll paper in S1106. In a case where the selected feeding port is "CUT PAPER" in S1105, the processor 301 decides to display the copy menu of the cut paper in S1107. In a case where the acquired result is "DISPLAY" in S1102, the processor 301 executes S1104. In S1104, the processor 301 decides to display the feeding port selection screen 901.

Figure 12:
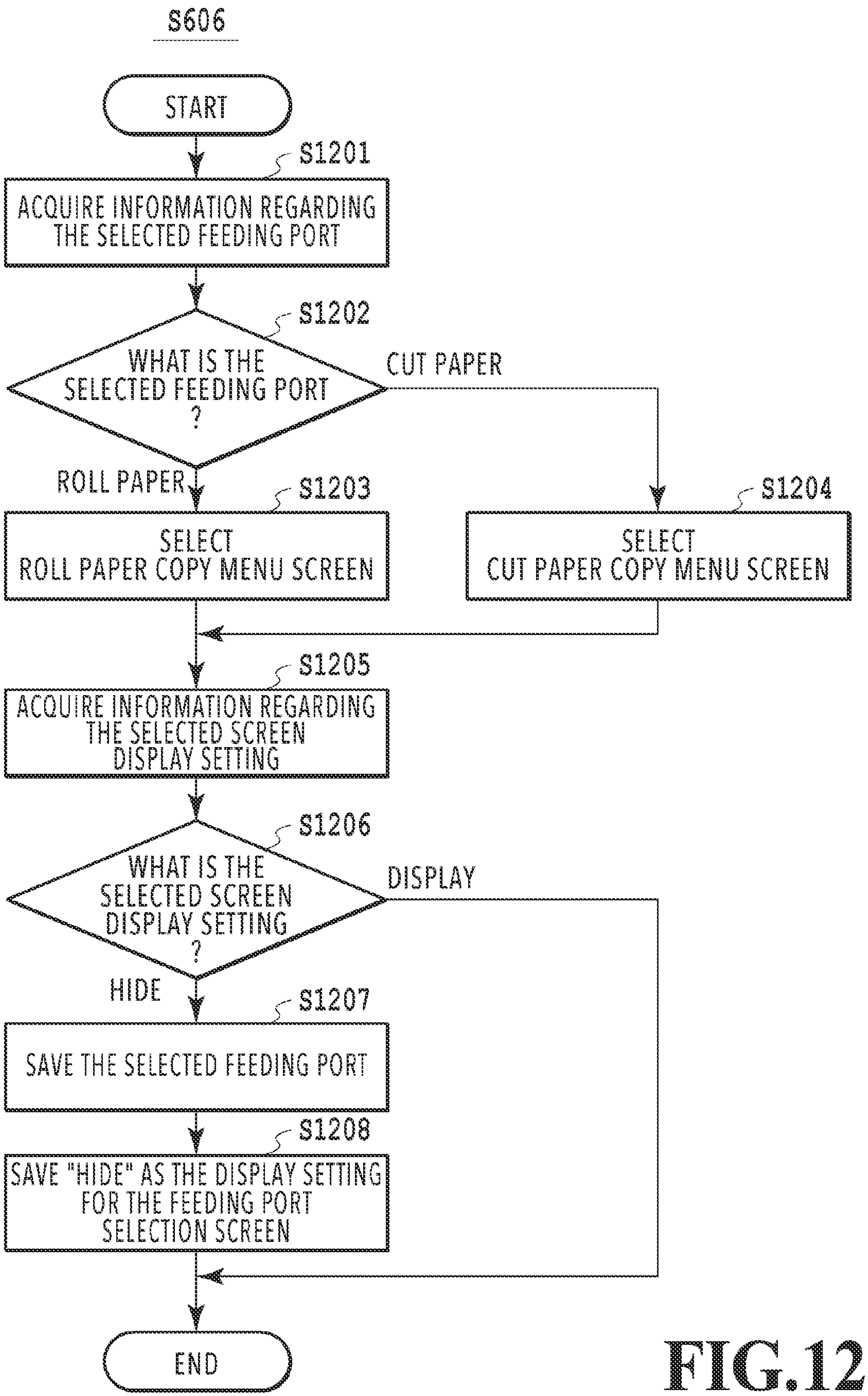
FIG. 12 is a flowchart illustrating feeding port selection state determination processing.

FIG. 12 is a flowchart illustrating the feeding port selection state determination processing. In the feeding port selection state determination processing in FIG. 12, the processor 301 decides the screen to be displayed following the feeding port selection screen according to the feeding port selected by the user. In addition, in the feeding port selection state determination processing in FIG. 12, the processor 301 performs a setting for controlling the screen to be displayed from the next time onwards according to the display setting regarding the feeding port selection screen in a case where both the roll paper and the cut paper are loaded. This processing is executed as a sub-flow of S606 included in the flow illustrated in FIG. 6. In the present drawing, the processing from S1201 to S1204 is the same as the processing from S801 to S804, respectively, and thus the explanation thereof is omitted here. In S1205, the processor 301 acquires information regarding the screen display setting selected on the feeding port selection screen 901. This processing is executed for the purpose of confirming whether or not the user wishes to hide the feeding port selection screen. In the present embodiment, this processing is processing for acquiring the ON/OFF state of the toggle switch illustrated in FIG. 9A and FIG. 9B. The acquired result is "DISPLAY" in a case where the hide setting is OFF, as the toggle switch 902 illustrated in FIG. 9A is, and "HIDE" in a case where the hide setting is ON, as the toggle switch 903 illustrated in FIG. 9B is. In a case where the processor 301 determines that the screen display setting selected on the feeding port selection screen 901 is "HIDE" in S1206, the processor 301 executes S1207 and S1208. In S1207, the processor 301 saves the user selection on the feeding port selection screen 901, i.e., the value acquired in S1201. At this time, the selection is saved in the program memory 303 of the image forming apparatus 100 as the feeding port selection. The feeding port selection saved here is acquired in S1103 of FIG. 11 described above. In S1208, the processor 301 saves the display setting for the feeding port selection screen as "HIDE". At this time, a setting value to hide is saved in an area in the program memory 303 of the image forming apparatus 100 for saving the display setting for the feeding port selection screen. The setting value of the display setting for the feeding port selection screen saved here is acquired in S1101 of FIG. 11 described above.

According to the embodiment described above, even in a case where both the roll paper and the cut paper are mounted, the user can omit operations on the feeding port selection screen. Therefore, the user can execute the copy function of printing on the desired sheet with the minimum number of operations, thereby improving the user's productivity.

OTHER EMBODIMENTS

In the above-described embodiment, the hide setting is performed using a toggle switch installed on the feeding port selection screen, but there is no limitation as such. For example, a toggle switch for switching the setting to display/hide and a button for selecting a feeding port may be installed on the screen of the display setting for the feeding port selection screen. The user can normally use such a screen to select a feeding port and perform the setting to hide the feeding port selection screen.

In the above-described embodiment, it is possible to perform a setting to hide the feeding port selection screen. Similarly, it is also possible to perform a setting to hide the roll paper copy menu screen 406 or the cut paper copy menu screen 409. That is, for example, if roll paper fit copying is always performed in a case of printing on the roll paper, the roll paper copy menu screen 406 can be hidden. For this purpose, a display/hide toggle button may be installed on the roll paper copy menu screen 406. By toggling the toggle button to hide and pressing the roll width fit copy button 407, roll paper fit copying can be selected from the next time onwards without displaying the roll paper copy menu screen 406. Similarly, for example, if normal copying is always performed in a case of printing on the cut paper, the cut paper copy menu screen 409 can be hidden. For this purpose, a display/hide toggle button may be installed on the cut paper copy menu screen 409. By toggling the toggle button to hide and pressing the normal copy button 410, normal copying can be selected from the next time onwards without displaying the cut paper copy menu screen 409.

In the above-described embodiments, the standby screen is displayed if the user presses the roll width fit copy button 407, the layout copy button 408, the normal copy button 410, or the ID card copy button 411. Then, printing is executed if the user presses a button on the standby screen or the start button 212 while the standby screen is displayed. However, there is no limitation as such, and printing may be executed immediately if the user presses the roll width fit copy button 407, the layout copy button 408, the normal copy button 410, or the ID card copy button 411.

In the above-described embodiments, the explanation is given of a case in which the present disclosure is applied to the execution of a copy function in the image forming apparatus 100. However, as long as the selection screen changes depending on the mounting status of the sheets, the present disclosure may be applied to a case of executing a function other than the copy function.

In the above-described embodiments, the screen is displayed on the display part 201 equipped in the image forming apparatus, and input by the user is accepted using the touch panel part 202 or the button 212 installed on the operation part 120. However, there is no limitation as such, and the screen may be displayed on a display part of a host apparatus such as a personal computer connected to an image forming apparatus, and input from the user may be accepted using a keyboard, pointing device, or the like of the host terminal.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-028500, filed on Feb. 27, 2023, which is hereby incorporated by reference herein in its entirety.

What is claimed is:

1. An image forming apparatus comprising:

a plurality of feeding units configured to correspond to respective types of sheets;

a detecting unit configured to detect whether or not a sheet is mounted in each of the feeding units; and a display control unit configured to display on a display part a preparation screen for printing on a type of sheet corresponding to one of the feeding units in a case where the type of sheet is mounted in the one of the feeding units whereas no sheet is mounted in any of other feeding units at the time a function including a printing function is selected, wherein in a case where sheets are mounted in the plurality of feeding units at the time the function including the printing function is selected, the display control unit causes the display part to display a selection screen for selecting one type of sheet from among a plurality of types of sheets corresponding to the plurality of feeding units, respectively, and causes the display part to display a preparation screen for printing on the type of sheet selected on the selection screen.

2. The image forming apparatus according to claim 1, wherein, in a case where the one type of sheet is selected on the selection screen along with an execution of a hiding setting, from that time onwards, the display control unit does not display the selection screen even in the case where sheets are mounted in the plurality feeding units at the time the function including the printing function is selected, and causes the display part to display the preparation screen for printing on the type of sheet selected on the selection screen along with the execution of the hiding setting.

3. The image forming apparatus according to claim 1, wherein, in a case where a hiding setting has been executed, the display control unit does not display the selection screen even in the case where sheets are mounted in the plurality of feeding units at the time the function including the printing function is selected, and causes the display part to display the preparation screen for printing on the type of sheet selected along with the execution of the hiding setting.

4. The image forming apparatus according to claim 1, wherein the respective types of sheets include roll paper and cut paper.

5. The image forming apparatus according to claim 1, wherein the display control unit displays a screen prompting mounting of a sheet in a case where sheets are not mounted in any of the feeding units.

6. The image forming apparatus according to claim 1, wherein the function including the printing function can be selected on a screen for selecting any one of a plurality of functions equipped in the image forming apparatus.

7. The image forming apparatus according to claim 1, wherein the display part is equipped in the image forming apparatus.

8. The image forming apparatus according to claim 1, wherein the display part is equipped in an apparatus connected to the image forming apparatus.

9. The image forming apparatus according to claim 1, wherein the preparation screen is a screen for selecting one printing format from among a plurality of printing formats.

10. The image forming apparatus according to claim 1, further comprising an image forming unit configured to execute printing, wherein the image forming unit prints on a sheet mounted in the feeding unit corresponding to the preparation screen displayed on the display part.

11. The image forming apparatus according to claim 10, further comprising an image reading unit configured to read an image, wherein the image forming unit prints the image read by the image reading unit.

12. A non-transitory computer-readable storage medium on which a program is recorded, the program, when executed, causing a processor of an image forming apparatus equipped with a plurality of feeding units configured to correspond to respective types of sheets to execute:

detecting whether or not a sheet is mounted in each of the plurality of feeding units; and displaying on a display part a preparation screen for printing on a type of sheet corresponding to one of the feeding units in a case where the type of sheet is mounted in the one of the feeding units whereas no sheet is mounted in any of other feeding units at the time a function including a printing function is selected, wherein in a case where sheets are mounted in the plurality of feeding units at the time the function including the printing function is selected, a selection screen for selecting one type of sheet from among a plurality of types of sheets corresponding to the plurality of feeding units, respectively, is displayed on the display part, and a preparation screen for printing on the type of sheet selected on the selection screen is displayed on the display part.

13. A display control method comprising:

detecting whether or not a sheet is mounted in each of a plurality of feeding units configured to correspond to respective types of sheets; and displaying on a display part a preparation screen for printing on a type of sheet corresponding to one of the feeding units in a case where the type of sheet is mounted in the one of the feeding units whereas no sheet is mounted in any of other feeding units at the time a function including a printing function is selected, wherein in a case where sheets are mounted in the plurality of feeding units at the time the function including the printing function is selected, a selection screen for selecting one type of sheet from among a plurality of types of sheets corresponding to the plurality of feeding units, respectively, is displayed on the display part, and a preparation screen for printing on the type of sheet selected on the selection screen is displayed on the display part.

* * * * *